United States Patent
Gibboney, Jr.

(10) Patent No.: US 9,899,813 B1
(45) Date of Patent: Feb. 20, 2018

(54) STRUCTURAL ELECTRIC POWER DISTRIBUTION SYSTEM

(71) Applicant: Christmas Northeast, Inc., Trumbull, CT (US)

(72) Inventor: James W. Gibboney, Jr., Conyers, GA (US)

(73) Assignee: Christmas Northeast, Inc., Trumbull, CT (US)

( * ) Notice: Subject to any disclaimer, the term of this patent is extended or adjusted under 35 U.S.C. 154(b) by 0 days.

(21) Appl. No.: 15/437,106

(22) Filed: Feb. 20, 2017

Related U.S. Application Data

(63) Continuation-in-part of application No. 15/063,948, filed on Mar. 8, 2016, now Pat. No. 9,614,322.

(51) Int. Cl.
| | |
|---|---|
| H02G 3/04 | (2006.01) |
| H01R 9/16 | (2006.01) |
| H01R 31/02 | (2006.01) |
| H02G 3/06 | (2006.01) |
| H01R 13/24 | (2006.01) |
| H01R 13/516 | (2006.01) |
| H01R 13/62 | (2006.01) |
| H01R 11/30 | (2006.01) |
| H01R 9/22 | (2006.01) |

(52) U.S. Cl.
CPC ............. H02G 3/0487 (2013.01); H01R 9/16 (2013.01); H01R 31/02 (2013.01); H02G 3/0418 (2013.01); H02G 3/0437 (2013.01); H02G 3/06 (2013.01); H01R 9/223 (2013.01); H01R 11/30 (2013.01); H01R 13/2421 (2013.01); H01R 13/516 (2013.01); H01R 13/6205 (2013.01)

(58) Field of Classification Search
CPC .. H01R 13/516; H01R 9/223; H01R 13/5213; Y10S 439/906
USPC ......................................... 439/731, 906, 367
See application file for complete search history.

(56) References Cited

U.S. PATENT DOCUMENTS

| | | |
|---|---|---|
| 2,573,920 A | 11/1951 | McLeod |
| 3,127,492 A | 3/1964 | Date |
| 3,706,882 A | 12/1972 | Eby |
| 3,871,734 A * | 3/1975 | Murtland .............. E21B 17/003 439/191 |
| 5,484,300 A | 1/1996 | Whitney et al. |
| 5,723,820 A | 3/1998 | Whitney et al. |
| 6,022,231 A | 2/2000 | Williams et al. |
| 6,575,764 B1 | 6/2003 | Reipur |
| 6,677,689 B2 | 1/2004 | Marihugh et al. |
| 7,833,027 B2 | 11/2010 | Jong |

(Continued)

FOREIGN PATENT DOCUMENTS

| | | |
|---|---|---|
| EP | 0231428 B1 | 11/1991 |
| WO | WO-2005020388 A1 | 3/2005 |

*Primary Examiner* — Abdullah Riyami
*Assistant Examiner* — Justin Kratt
(74) *Attorney, Agent, or Firm* — Nexsen, Pruet, LLC; Michael A. Mann

(57) ABSTRACT

An electrical power distribution system for use in providing power for personal, commercial, and industrial uses. The electrical power distribution system may be incorporated in products such as safety barriers, velvet ropes for events, office furniture and home interior trim. The basic component is a conduit section that holds identical electrical connectors at each ends and which interconnect and interlock automatically when rotated to the correct orientation, at which point they have the correct polarity.

19 Claims, 11 Drawing Sheets

(56) References Cited

U.S. PATENT DOCUMENTS

| | | | |
|---|---|---|---|
| 7,988,484 B1* | 8/2011 | Jacoby | H01R 13/6392 |
| | | | 439/367 |
| 8,272,876 B2 | 9/2012 | Schultz | |
| 8,863,416 B2* | 10/2014 | Leung | A47G 33/06 |
| | | | 40/442 |
| 8,870,587 B2* | 10/2014 | Nooner | H01R 13/516 |
| | | | 439/165 |
| 8,936,472 B1 | 1/2015 | Gibboney, Jr. | |
| 9,004,924 B2* | 4/2015 | Kuo | H01R 13/6205 |
| | | | 439/188 |
| 2010/0181841 A1 | 7/2010 | Azancot et al. | |
| 2011/0159706 A1 | 6/2011 | Wu | |
| 2012/0295451 A1 | 11/2012 | Hyun-Jun et al. | |
| 2015/0111403 A1 | 4/2015 | Byrne | |

\* cited by examiner

STRUCTURAL ELECTRIC POWER DISTRIBUTION SYSTEM

TECHNOLOGY FIELD

The technological field of the disclosure is electrical power distribution and, in particular, the distribution of electrical power for convenient, temporary use.

BACKGROUND

Traditionally, electrical power service has been provided for the use of occupants of a building by running power lines from a central junction box throughout the walls of the building on each floor. The power lines terminate in wall sockets. The number and placement of the wall sockets has been designed for the anticipated use of each room, which is often specified by building codes. However, the need for access to electrical power has increased as more and more electrical appliances have been added to the retinue of electricity-demanding devices.

Furthermore, the need for electricity has spread beyond the four walls of homes, apartment buildings, and office buildings, to such requirements as exterior lighting, charging batteries of lawn care equipment, automobiles and for operating temporary and portable electrical devices and appliances at construction sites, outdoor events, patio restaurants, and for the electrical demands of travelers in automobiles, airplanes, trains, and buses. The type of electrical power needed has also expanded and includes alternating current and direct current as well as different levels of voltage.

In the out-of-doors, portable generators may be employed to generate electrical power for, say, construction sites, emergency roadside conditions, or outdoor events, but the delivery of that power relies on electrical cords laying on the ground or perhaps raised off the ground to be slung from one temporary post to the next.

There remains a need for new electrical power delivery systems with the flexibility to satisfy a growing range of needs by consumers of that power.

SUMMARY

The present disclosure presents a structural system for delivering electrical power. The system is based on pairs of universal electrical connectors connected to each other by electrical wires and carried inside a section of conduit. Conduit sections can be formed as tubes joined to other conduit sections or as half cylinders for more easily receiving electrical wires and then the half cylinders can be joined. The electrical connectors inside the conduit are those described in co-pending and commonly owned U.S. Pat. No. 9,614,322, issued Apr. 24, 2017, for a Magnetic Repulsion-Based Electrical Connector, which is incorporated by reference herein in its entirety. The electrical connectors in the present disclosure operate essentially as disclosed and described in this related application.

According to the present system, two spaced-apart electrical connectors are joined to each other by electrical wiring in a manner generally similar to an extension cord with one electrical connector on one end and another electrical connector on the other end. Both electrical connectors are positioned inside the same conduit section. A first electrical connector is recessed within a first end of a first conduit section and a second electrical connector is mounted flush in the second end of the first conduit section.

When two conduit sections are joined, the second end of a second conduit section is inserted into the first end of the first conduit section so that the second electrical connector of the second conduit section is inside and adjacent to the recessed first electrical connector of the first conduit section. If the second electrical connector of the second conduit section is oriented toward the first electrical connector of the first conduit section, their first terminals will be automatically aligned with the non-movable terminals using the magnetic repulsion which will result in the non-movable terminals moving away from each other and toward the movable terminals. The magnet surrounding the movable terminal of each is oriented the same way so movable terminals will repel and movable and non-movable terminals will make contact. Because of the magnetic forces between the movable terminal in the first electrical connector and the immovable, ferromagnetic terminal in the second electrical connector, the correct magnetic terminals of each electrical connector will be pulled and held partially outside of their respective passages and into the passages of the recessed ferromagnetic non-movable terminals, which produces the electrical connection and preserves parity. The movement of the movable terminal into the passage of the recessed non-movable terminal also prevents lateral forces from easily separating the electrically connected terminals. Because the electrical terminals move with each other, locked together, vibrations and small movements due to traffic across the conduits will not cause power interruptions, arcing, and flickering lights.

Conduit sections can be standardized and available in sets of straight and curved or angled conduit sections. Accordingly, conduit sections can be selected to form nearly any structural configuration. In addition, a universal conduit section is provided in which a first end can be rotated for changes in direction from one section to another where more flexibility is needed than available from a selection of angled conduit sections.

Conduit sections with a cylindrical interior passage can have an external appearance that is not cylindrical and have an appearance unrelated to the electrical connectors and wiring inside. The external appearance of conduit sections may even be ornamental, such as wainscot molding, or simply for serving as trim for another structure (such as trim pieces on the edges of modular panels), and carry the electrical connectors inside for transferring electric power. Joined conduit sections can also serve as stand-alone structures having a primary purpose other than delivering electrical current, such as velvet rope for use at events, but can be conveniently used to deliver electrical current in a discrete and convenient way for lighting, for example. Conduit sections may also be used to deliver digital data and messages via carrier waves.

The conduit sections may have a primary purpose, in the sense of an ostensible, apparent purpose in addition to providing structure for the connectors and their wiring and being an easy package for which to build a structural electric distribution system. For example, the conduit section may be load-bearing as support beams for a patio. The conduit sections may form a barrier that informs the public about a boundary, such as a safety barricade, a fence rail or construction barrier, while also conveniently delivering electrical power to flood lights, a gate lock or a gate intercom.

Herein are disclosed various mechanisms that enable two conduit sections to be joined, such as, for example, threaded couplings, sleeves, locking couplings, frictional fittings or interference fittings between a first conduit section having a slightly expanded diameter at one end to define a step inside the conduit section so another conduit section with an end having an unexpanded diameter can be received therein.

The electrical connectors may also carry additional electrical contacts or contact pins for use in establishing an electrical connection between remote conduit sections with their electrical connectors. A contact pin in a remote electrical connector may verify that the electrical contacts of the terminals have been properly made throughout each intervening electrical connector, or determine if a break in connection occurs, and where the break occurred. The contacts can also deliver electricity of a different type such as low voltage DC, or transmit information in the form of voice or digital data.

Importantly, especially because a conduit section network may be complex, conduit sections may carry additional electrical wiring for electrical circuits in parallel to the primary electrical power wiring to provide the capability to make management of the network easier, such as control signals, digital data transmission, identification information, and administrative information. As examples of this capability, wiring running in parallel to the primary electrical power wiring may carry voice communication from one end of a construction site to another or digital programming signals to permit control of security systems for a building.

Those skilled in electrical power demand and distribution will realize and appreciate other aspects of the disclosure from a careful reading of the Detailed Description accompanied by the drawings.

BRIEF DESCRIPTION OF THE DRAWINGS

In the figures.

DETAILED DESCRIPTION

Figure 1:
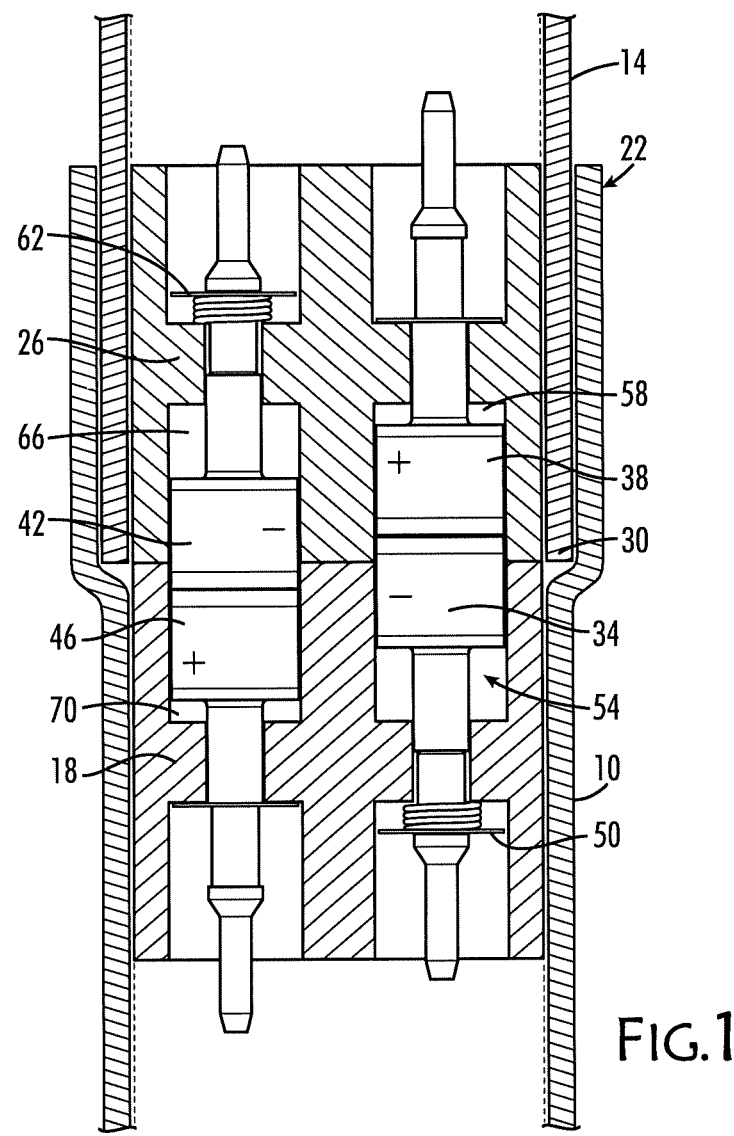
FIG. 1 is a side cross-sectional view of two conduit sections with electrical connectors carried therein.

Turning now to the drawings, FIG. 1 is a cross-sectional view of portions of two conduit sections, namely a first conduit section 10 and a second conduit section 14, with a second end 30 of second conduit section 14 inserted into first end 22 of first conduit section 10. First conduit section 10 has a slightly enlarged diameter at its first end 22 than that of second end 30 of second conduit section 14.

A first electrical connector 18 is recessed into first end 22 of first conduit section 10, and a second electrical connector 26 is seated flush with the second end 30 of second conduit section 14.

First and second electrical connectors 18, 26, are properly oriented in FIG. 1 so that they will connect physically and electrically so as to pass electricity. First terminal 34 of first electrical connector 18 is magnetically attracted to second terminal 38 of second electrical connector 26 and first terminal 42 of second electrical connector 26 is attracted to a second terminal 46 of first electrical connector 18. First terminal 34 of first electrical connector 18 will connect physically and electrically with second terminal 38 of second electrical connector 26 on being magnetically attracted to second terminal 38, which is ferromagnetic, and being drawn against the urging of spring 50 partially out of passage 54 and into passage 58 of second terminal 38. Similarly, first terminal 42 will also connect physically and electrically with second terminal 46, which is ferromagnetic, on being magnetically attracted to first terminal 42, which is magnetic, and being urged magnetically against the urging of spring 62 partially out of passage 66 of first terminal 42 and into passage 70 of second terminal 46.

When first electrical connector 18 and second electrical connector 26 are physically and electrically connected as described, electrical current can flow from first electrical connector 18 to second electrical connector 26. Similarly, additional conduit sections can be attached in the same manner to distribute electrical current from conduit section to conduit section. Conduit sections, moreover, may serve various functions in addition to facilitating the interconnection of the electrical connectors. Conduit sections may be made of metal, such as steel, a composite material, nylon or other rigid, strong material.

For providing electrical power over a distance under circumstances in which electrical connectors similar to first and second electrical connectors 18, and 26 and their associated wiring are to be protected or under circumstances in which a structural element is needed, for example, as a barrier or guide, and which structural element may serve the additional function of delivering electrical power, these needs may be facilitated by connecting several conduit sections together in series. Inevitably, a series of such conduit sections may need to avoid obstacles or change direction for other reasons.

Figure 2:
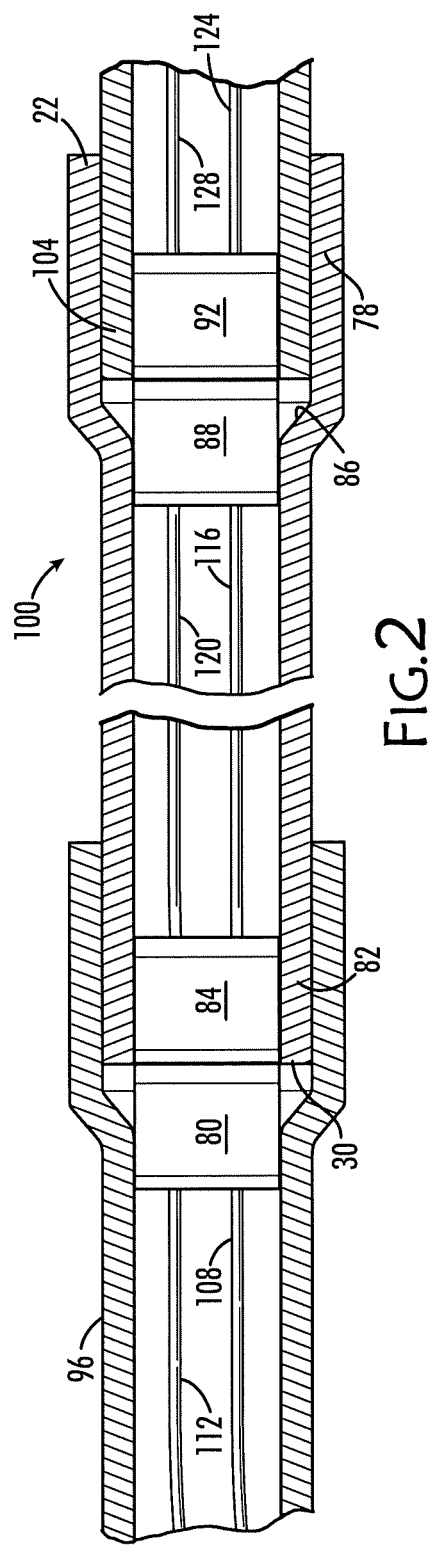
FIG. 2 is a side cross-sectional view of portions of three conduit sections joined together to pass electricity across two pair of electrical conduit sections of the type shown in FIG. 1.
Figure 8:
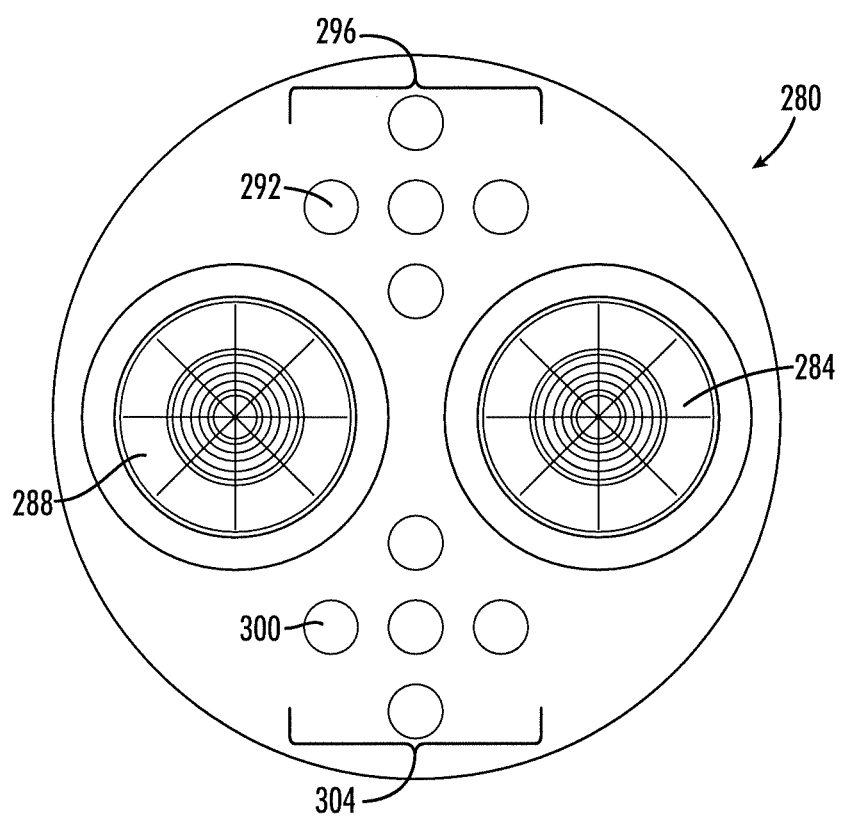
FIG. 8 is a top view of an electrical connector showing pins for additional functionality, according to an aspect of the disclosure.

FIG. 2 is similar to FIG. 8 in U.S. Pat. No. 9,614,322, issued Apr. 4, 2017 referenced above, and these figures show simplified drawings of two sets of electrical connectors 80, 84, 88, 92, joined physically and electrically in three conduit sections 96, 100, 104. Conduit 100 has a first end 22 and a second end 30 and a first portion 78 and a second portion 82. First portion 78 is expanded with respect to second portion 82 thereby defining a step 86 inside conduit 100. First end 22 begins first portion 78 of conduit 100 and second end 30 begins second portion 82. First portion 78 and second portion 82 meet at step 86. An electrical connector 88 is inserted into first end 22 of first portion 78 and seated in second portion 82 flush with step 86. An electrical conductor 84 is inserted in second end 30 and seated flush with second end 30. Electrical wires 108 and 112 carry electrical current to electrical connector 80, which current is passed to electrical connector 84 and then, via electrical wires 116 and 120, the electrical current passes to electrical connector 88, which in turn passes it to electrical connector 92. Electrical connector 92 then passes the electrical current over wires 124 and 128. Conduit sections, 80, 82, and 84, in FIG. 2, are all straight conduit sections.

Figure 3:
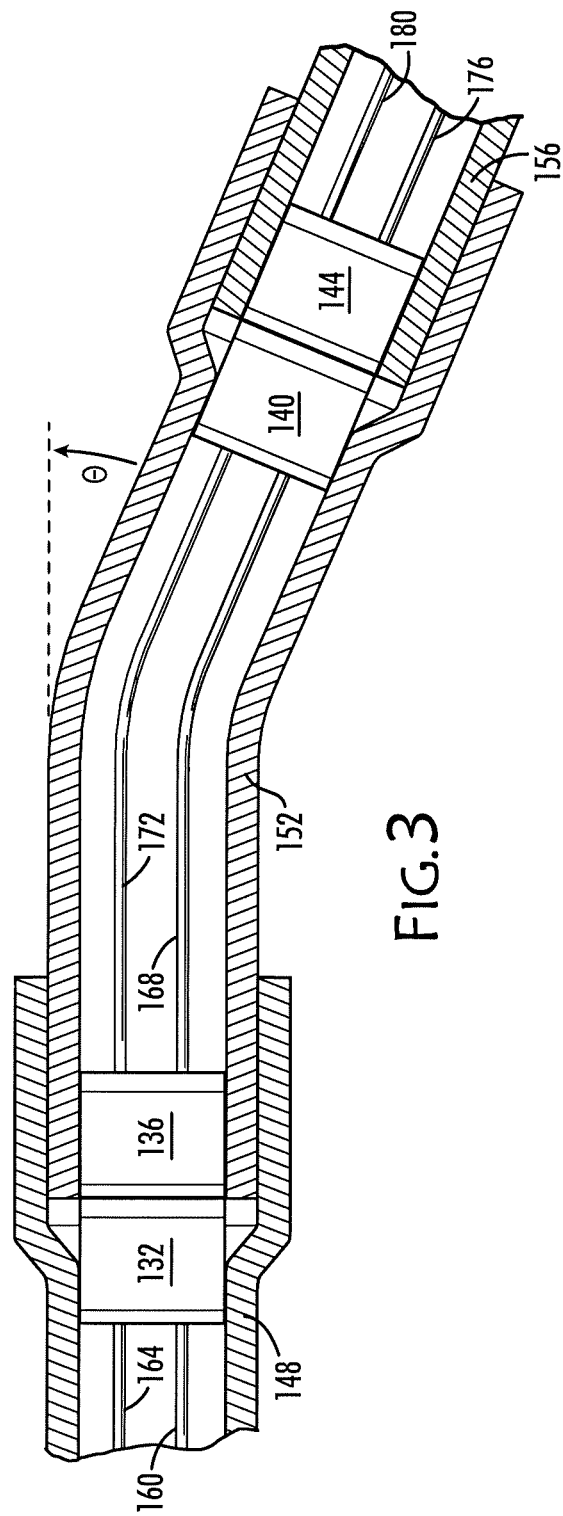
FIG. 3 is a side cross-sectional view of portions of three conduit sections with electrical connectors shown without their detail, and with a center conduit section having a 15-degree bend formed therein.

In FIG. 3, shows first electrical connector 132 connected physically and electrically with a second electrical connector 136. A third electrical connector 140 is physically and electrically connected with a fourth electrical connector 144. First and second electrical connectors 132, 136, pass electrical current from a first conduit section 148 to a second conduit 152. Third and fourth electrical connectors 140, 144 pass electrical current between a second conduit 152 and a third conduit 156. Wires 160, 164 carry electrical current to first electrical connector 132, which passes the current to second electrical connector 136. Second electrical connector 136 passes the current via wires 168, 172 to third electrical connector 140, which passes the electrical current to fourth electrical connector 144, from where it travels via wires 176, 180 onwards.

Note that second conduit 152 has is bent to provide an angle φ of 15 degrees. Other angles φ, such as 30 degrees, 45 degrees, 60 degrees, 75 degrees and 90 degrees are equally possible and provide a range of choices in addition to conduit with no bends, for navigating obstacles and generally following a prescribed course in order to satisfy the need for flexibility.

FIGS. 4, 5, 6, and 7 illustrate an alternative or additional way of connecting conduits to lead in a different direction than that shown in FIG. 3. In these figures are shown different views of a universal conduit section 200 that can be inserted between any two conduit sections, such as those illustrated in FIGS. 2 and 3, in place of a conduit section. Universal conduit section 200, as best seen in a top, cross-sectional view in FIGS. 4, 5, 6 and 7, has a housing 204 with a cover 208 and a base 212 that rotates about axis A with respect to each other. A bolt shaft 216 attached to base 212 and having a threaded end 220 extends through a hole 224 in cover 208 where a washer 228 and nut 232 are used to secure cover 208 to base 212. A tapered gasket 234 sitting in a groove 210 seals cover 208 to base 212. Loosening nut 232 allows cover 208 to be rotated with respect to base 212.

Extending radially from base 212 is a lower pipe 236 secured to a first adaptor 240 that conforms to the exterior surface of base 212 and to cover 208 extending vertically so as to engage cover 208 when cover 208 is joined to base 212.

Similarly, extending radially from cover 208 is an upper pipe 244 secured to cover 208.

Cover 208 and base 212 each have a thickness, or vertical dimension, that matches the diameters of lower pipe 236 and upper pipe 244, respectively, and conforms to the diameter of the conduit sections to which they will be attached. For example, if a conduit section is shaped as shown in FIG. 2 as conduit section 100, namely, having one end with an expanded diameter, it will receive lower pipe 236 which has a diameter insertable into the larger diameter on the end of conduit section 100 as shown. Lower pipe 236 thus replicates the nominal diameter of a conduit section. Moreover, lower pipe 236 has a first electrical connector 252 mounted to be flush with the end of lower pipe 236 rather than recessed so first electrical connector 252 can be connected directly to electrical connector 88 in conduit section 100 of FIG. 2.

Upper pipe 244 has an expanded diameter compared to that of the diameter of lower pipe 236. Accordingly, upper pipe 240 can received a conduit section similar to conduit section 104 of FIG. 2. Upper pipe 240 carries a second electrical connector 256. On receiving a conduit section 104, second electrical connector 256 will be able to connect with electrical connector 92 in the same manner as electrical connector 88 is shown connecting with electrical connector 92 in FIG. 2.

Figure 7:
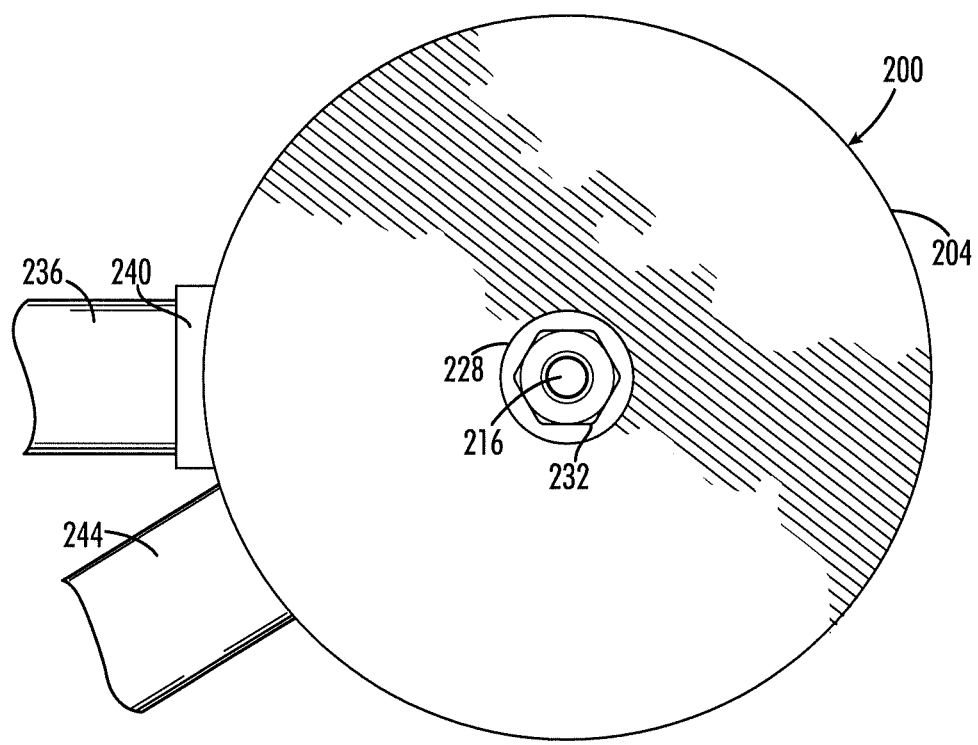
FIG. 7 is a detailed, cross-sectional view of the junction between the cover and the base of the universal coupler showing the tapered gasket, according to an aspect of the disclosure.

Universal conduit section 200 with lower pipe 236 and upper pipe 244 may be inserted between two conduit sections and serve as a replacement conduit. In place, the relative angle between lower pipe 236 and second pipe 244 can be set by loosening nut 232 and rotating cover 208 with respect to base 212 to the desired angle and then tightening nut 232. FIG. 7 shows a change in angle from the original direction of lower pipe 236 to that of upper pipe 244.

Figure 4:
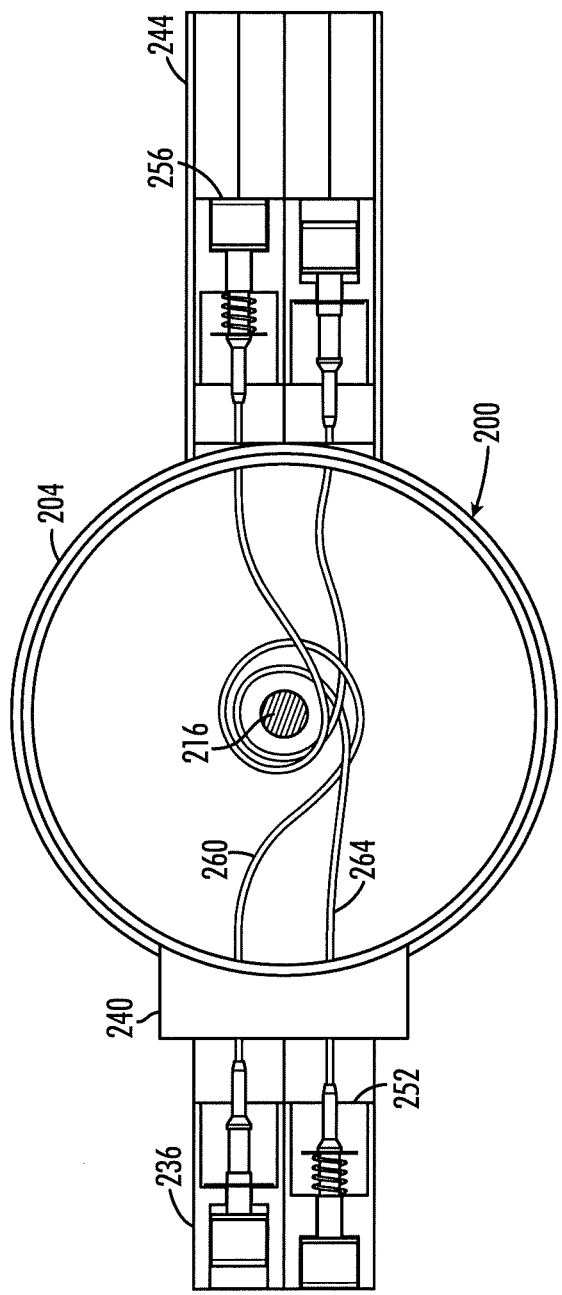
FIG. 4 shows a top, cross-sectional view of a universal conduit section with electrical connectors in its two partial sections, according to an aspect of the disclosure.
Figure 5:
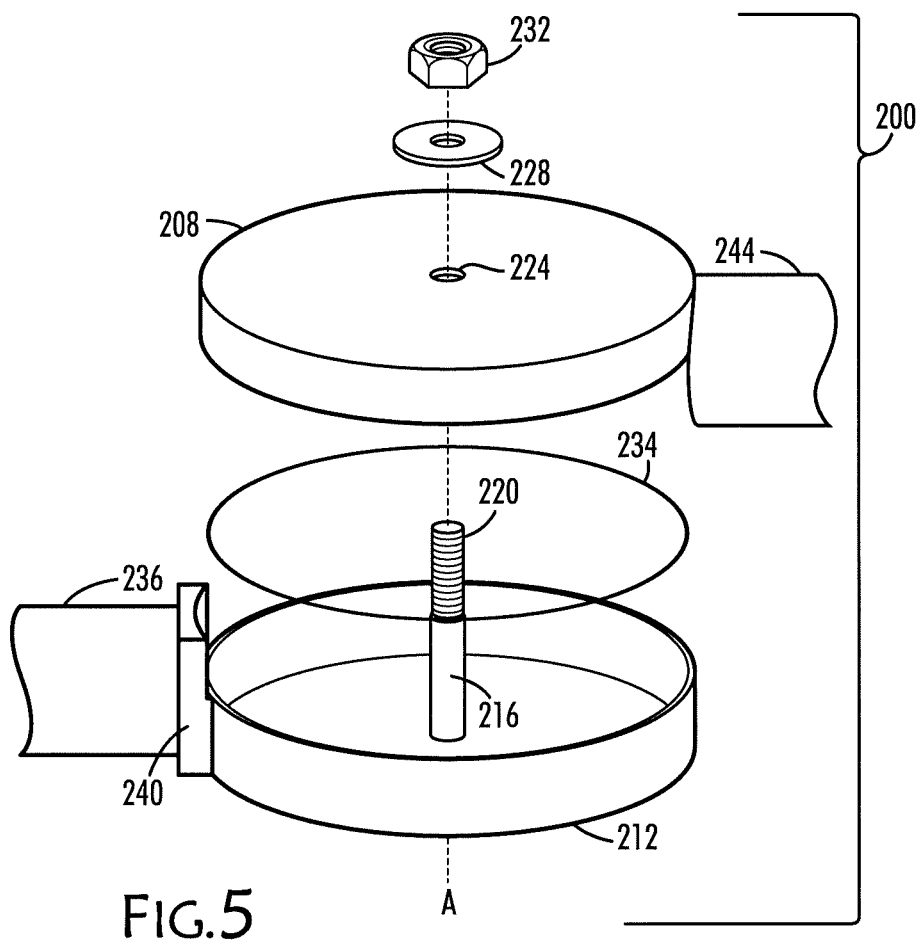
FIG. 5 is an external view of a universal conduit section arranged to accommodate a sharp angle change in direction, according to an aspect of the disclosure.
Figure 6:
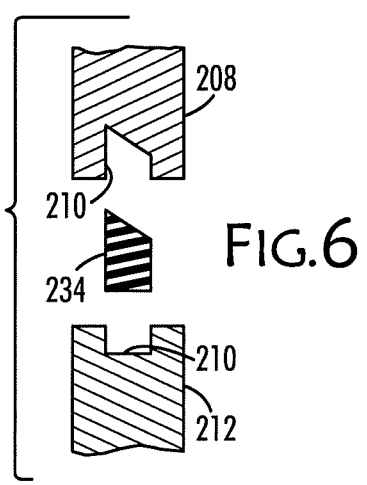
FIG. 6 is an exploded, perspective view of the universal conduit section, according to an aspect of the disclosure.

Inside lower pipe 236, as best seen in FIGS. 4 and 5, is a first electrical connector 252; inside second pipe 244 a first electrical connector 252 is in electrical connection with a second electrical connector 256 via a pair of wire conductors 260, 264. Wire conductors 260, 264 wind around bolt shaft 216. Rotation of cover 208 with respect to base 212 to allow flexibility for wire conductors 260, 264.

Figure 9:
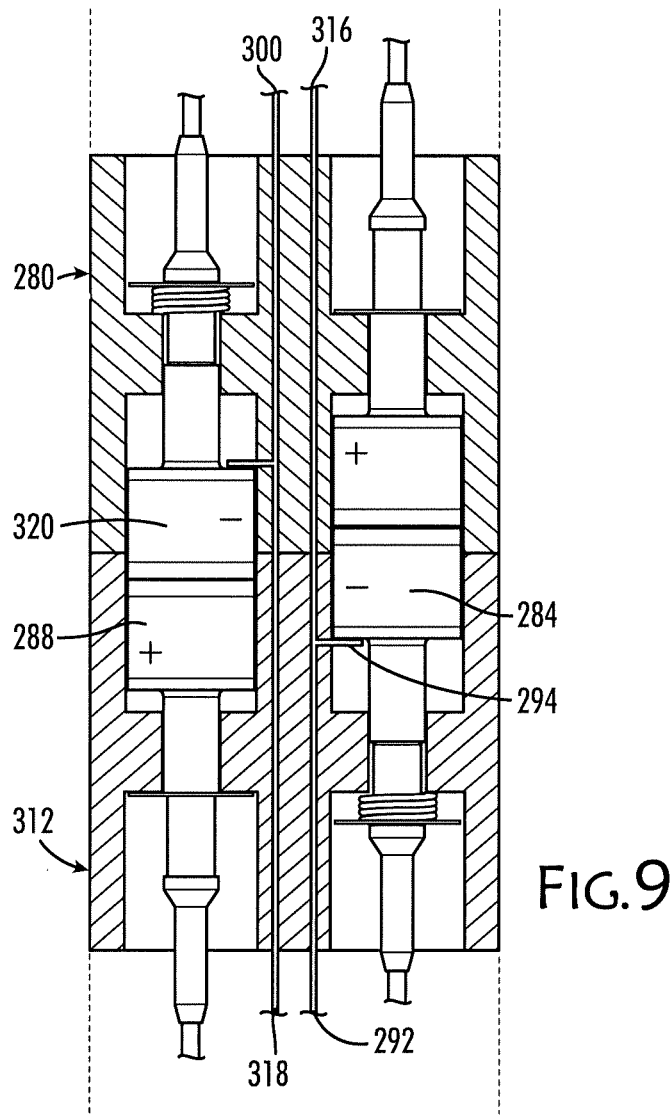
FIG. 9 is a cross sectional view of a pair of engaged electrical connectors each having a pin that follows its movable terminal to make contact with the pin of the other electrical connector.
Figure 10:
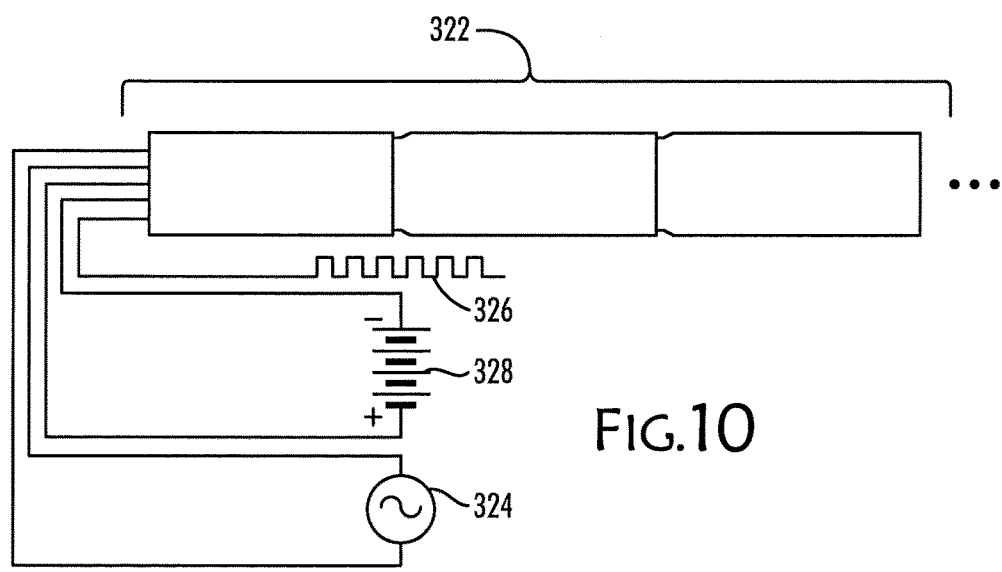
FIG. 10 is a schematic diagram showing examples of uses of pins in electrical connectors for digital data, direct current voltage supply, and alternating current.

FIGS. 8, 9, and 10 illustrate an electrical connector 280 with additional features. In addition to a first terminal 284 and a second terminal 288, there are two sets of pins, namely, a first pin set 296 and a second pin set 304, but the number of pins and pin sets may be different. A first pin 292 from a first pin set 296 may have a corresponding second pin 300 in second pin set 304 that it may make contact with. First and second pin sets 296, 304, can be assigned other functions than the function of transferring electrical current that is assigned to terminals 284 and 288. For example, first pin 292 and second pin 300 can transfer digital data for control purposes or transfer audible information. Alternatively, first pin 292 and second pin 300 may carry a five-volt DC potential for use in low voltage applications.

As seen in FIG. 9, first pin 292 may be attached to terminal 284 (which first terminal 284 is movable) on electrical connector 312 using a follower 294 and will rise when electrical connector 312 is brought into engagement with a second electrical terminal 280 in the right orientation so that pin 292 makes contact with a first stationary pin 316. Second pin 300 on a terminal 320 (which is also a movable terminal) of electrical connector 312 will simultaneously make contact with a second stationary pin 316. As terminals 284, 320, emerge from the electrical connector 280 and its opposing electrical connector 312 respectively, first pin 292 and second stationary pin 316 are tied to the movement of their respective terminal 284, 320, and therefore emerge on opposing top surfaces of electrical connectors 280 and 312 where they make contact with each other.

FIG. 10 shows a series of conduit sections 322 distributing alternating current 324 as well as providing additional functions through first and second pin sets 296, 304, shown in FIG. 8. The additional functions chosen for illustration are digital data 326 and a small direct current voltage 328.

Figure 11A:
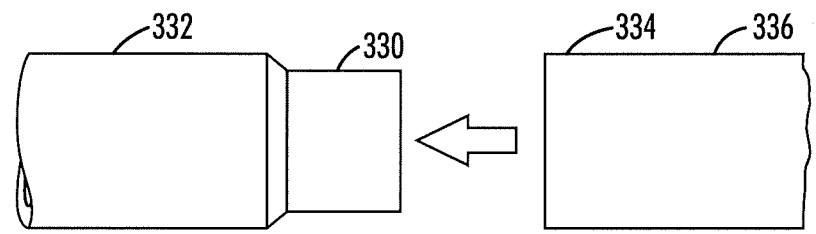
FIGS. 11A-11D illustrate four ways to connect conduit sections together, according to aspects of the disclosure.

Conduit sections may be connected using any of several techniques that are quick and easy to use in connecting two conduit sections. FIG. 11A-11D illustrate several such techniques including the one primarily used in the foregoing description, namely a friction-fit connection with a reduced diameter on a first end 330 of a first conduit section 332 so that it fits readily into the first end 334 of a standard-sized, second conduit section 336, as shown in FIG. 11A.

Figure 11B:
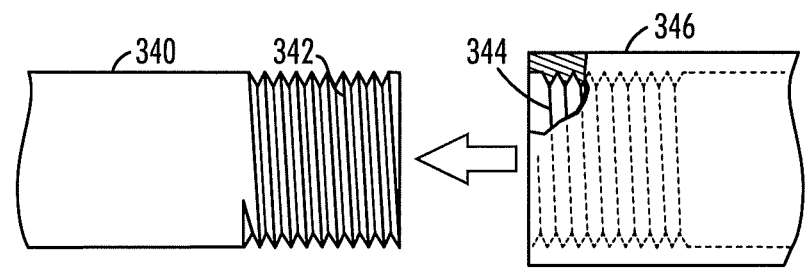

FIG. 11B shows a conduit configuration in which the ends of both are modified. In particular, a first conduit section 340 that has external threads 342 formed on one end to be threaded to internal threads on an end 344 of second conduit section 346.

Figure 11C:
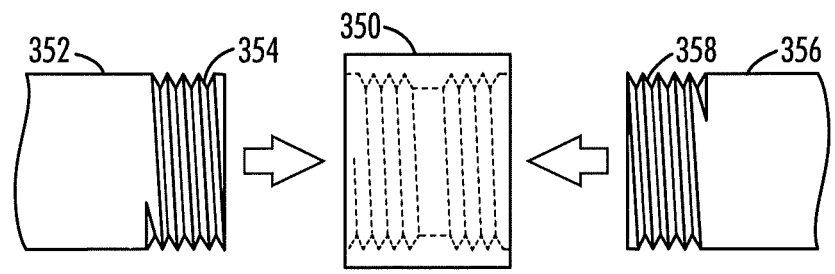

FIG. 11C shows a coupler 350 used to join first and second conduit sections 352, 356 both of which carry external threads on their respective ends 354,358.

Figure 11D:
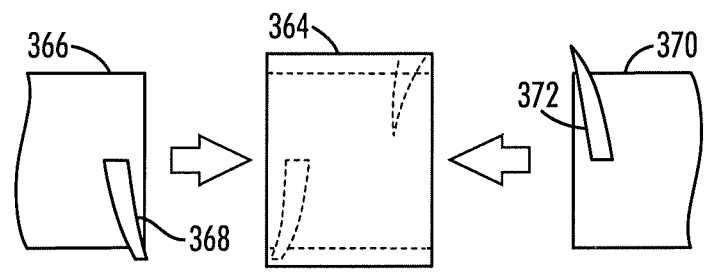

FIG. 11D and a first and second conduit section 366, 370, in FIG. 11C. Conduit sections 366, 370, may each have a bayonet threads 368, 372. Coupler 364, is simpler than coupler 350 so that, with a 180-degree rotation, it receives the bayonet threads of first and second conduit sections 366, 370, to resist uncoupling.

Figure 12:
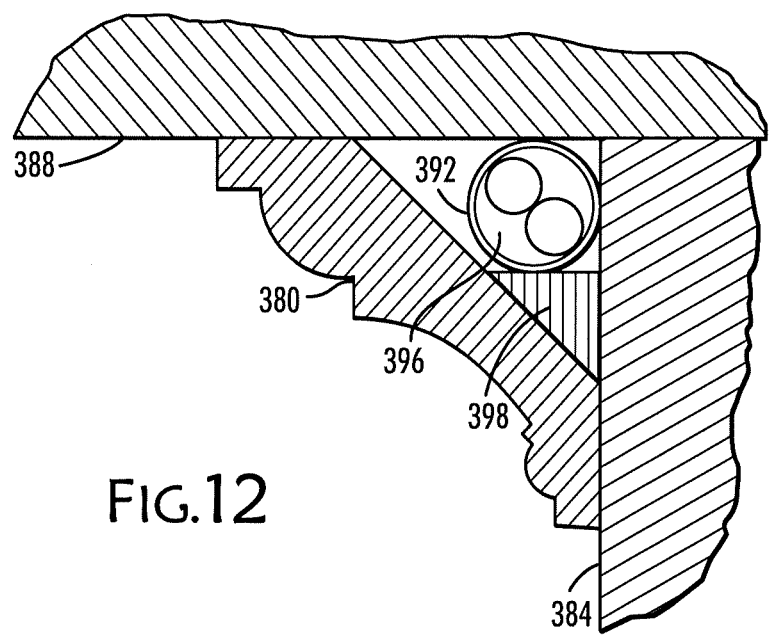
FIG. 12 is a cross sectional view of the present structural electric power distribution system incorporated behind crown molding.

FIG. 12 illustrates the use of the present electrical current distribution system used with crown molding 380 attached to a wall 384 and ceiling 388 with the present conduit section 392 with an electrical connector 396 positioned inside conduit section 396 and resting on a backing block 398 where conduit section 392 is not visible as it traverses a room. This configuration is one of many possibilities for use as a way to discretely distribute electrical power in the interior of a building after the building construction is complete but when additional power is needed.

What is claimed is:

1. An electrical power distribution system, comprising:
   a first electrical connector having a movable terminal containing a first magnet and a non-movable terminal containing a first ferromagnet;
   a second electrical connector having a movable terminal containing a second magnet and a non-movable terminal containing a second ferromagnet, said movable terminal of said first electrical connector being movable with respect to said first electrical connector, and said movable terminal of said second electrical connector being movable with respect to said second electrical connector;
   electrical wiring running from said movable terminal and said non-movable terminal of said first electrical connector to said movable terminal and said non-movable terminal of said second electrical connector; and
   a conduit section containing said first electrical connector, said second electrical connector, and said electrical wiring.

2. The electrical power distribution system of claim 1, wherein said conduit section has a first end and a second end and a first portion and a second portion, said first portion being expanded with respect to said second portion thereby defining a step inside said conduit section, and wherein said first end begins said first portion and said second end begins said second portion and said first portion and said second portion meet at said step, and wherein said first electrical connector is inserted into said first end and seated in said second portion flush with said step and said second electrical connector is inserted in said second end and seated flush with said second end.

3. The electrical power distribution system of claim 1, further comprising a coupler operable to join said conduit section to a second conduit section.

4. The electrical power distribution system of claim 1, wherein said conduit section has a cylindrical inside and a non-cylindrical outside.

5. The electrical power distribution system of claim 1, wherein said conduit section has a cylindrical inside and an ornamental outside.

6. The electrical power distribution system of claim 1, wherein said conduit section is flexible.

7. The electrical power distribution system of claim 1, wherein said conduit section is made of steel.

8. The electrical power distribution system of claim 1, wherein said conduit section is bent.

9. The electrical power distribution system of claim 1, wherein said conduit section is a universal conduit section having
   a housing having an interior and including a cover and a base, said cover and said base being rotatable with respect to each other;
   a shaft running inside said housing and fixed with respect to said base and extending through a hole in said cover;
   a lower pipe in communication with said interior of said housing;
   an upper pipe in communication with said interior of said housing;
   said first electrical connector being in said lower pipe;
   said second electrical connector being in said upper pipe;
   said electrical wiring running from said first electrical connector in said lower pipe into said interior of said housing, around said shaft and out said upper pipe to said second electrical connector; and
   means for attaching said cover to said base.

10. The electrical power distribution system of claim 9, wherein said base includes a groove formed therein and further comprising a gasket fitted in said groove.

11. The electrical power distribution system of claim 10, wherein said gasket is tapered.

12. The electrical power distribution system of claim 1, wherein said first electrical connector carried a first pin that is electrically conductive and said second electrical connector carries a second pin that is electrically conductive, and further comprising wires running from said first pin to said second pin.

13. The electrical power distribution system of claim 12, wherein said wires carry a direct current voltage.

14. The electrical power distribution system of claim 12, wherein said wires carry digital data.

15. An electrical power distribution system, comprising:
   (a) a first conduit having a first end and a second end;
   (b) a second conduit having a first end and a second end, said second end of said first conduit joined to said first end of said second conduit;
   (c) a first electrical connector in said second end of said first conduit;
   (d) a second electrical connector in said first end of said second conduit;
   (e) a first movable terminal in said first electrical connector, said first movable terminal carrying a first magnet;
   (f) a first non-movable terminal in said first electrical connector, said first non-movable terminal carrying a first ferromagnet;
   (g) a second movable terminal in said second electrical connector, said second movable terminal carrying a second magnet, wherein said second movable terminal moves into electrical contact with said first non-movable terminal of said first electrical connector by attraction of said second magnet of said second movable terminal to said first ferromagnet of said first non-movable terminal; and
   (h) a second non-movable terminal in said second electrical connector, said second non-movable terminal carrying a ferromagnet, wherein said first movable terminal of said first electrical connector moves into electrical contact with said second non-movable terminal of said second electrical connector by attraction of said first magnet of said first movable terminal to said second ferromagnet of said second non-movable terminal.

16. The electrical power distribution system of claim 15, wherein said first end of said second conduit has a larger inner diameter than an outer diameter of said second end of said first conduit, and wherein said first end of said second conduit is inserted into said second end of said first conduit.

17. The electrical power distribution system of claim 15, wherein said second end of said second conduit has a third electrical connector with a third movable terminal and a third non-movable terminal.

18. The electrical power distribution system of claim 17, further comprising a first electrical conductor running from said second movable terminal to said third non-movable terminal and a second electrical conductor running from said second non-movable terminal to said third movable terminal.

19. The electrical power distribution system of claim 15, wherein said second end of said second conduit has a larger inner diameter than an outer diameter of said first end of said third conduit, and wherein said first end of said third conduit is inserted into said second end of said second conduit.

\* \* \* \* \*